United States Patent
Winner et al.

(10) Patent No.: US 6,842,687 B2
(45) Date of Patent: Jan. 11, 2005

(54) METHOD AND DEVICE FOR ASSISTING IN A PASSING MANEUVER FOR MOTOR VEHICLES

(75) Inventors: Hermann Winner, Bietigheim (DE); Ralph Lauxmann, Korntal-Muenchingen (DE); Albrecht Irion, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/296,834

(22) PCT Filed: Jan. 30, 2002

(86) PCT No.: PCT/DE02/00305

§ 371 (c)(1),
(2), (4) Date: Apr. 21, 2003

(87) PCT Pub. No.: WO02/076780

PCT Pub. Date: Oct. 3, 2002

(65) Prior Publication Data

US 2003/0163239 A1 Aug. 28, 2003

(30) Foreign Application Priority Data

Mar. 23, 2001 (DE) .......................................... 101 14 187

(51) Int. Cl.[7] .............................................. G05D 13/00
(52) U.S. Cl. ......................... 701/93; 180/169; 180/170; 701/96
(58) Field of Search ....................... 701/93, 96; 180/169, 180/170; 340/435, 903

(56) References Cited

U.S. PATENT DOCUMENTS

| | | | |
|---|---|---|---|
| 5,375,060 A | * 12/1994 | Nocker | 701/96 |
| 5,400,864 A | * 3/1995 | Winner et al. | 701/96 |
| 5,629,851 A | * 5/1997 | Williams et al. | 701/96 |
| 5,684,697 A | * 11/1997 | Mullen | 701/28 |
| 5,761,629 A | * 6/1998 | Gilling | 701/96 |
| 5,999,874 A | * 12/1999 | Winner et al. | 701/93 |
| 6,304,811 B1 | * 10/2001 | Prestl | 701/96 |
| 6,353,788 B1 | * 3/2002 | Baker et al. | 701/96 |
| 6,427,111 B1 | * 7/2002 | Dieckmann | 701/96 |

FOREIGN PATENT DOCUMENTS

| | | |
|---|---|---|
| DE | 42 00 694 | 7/1993 |
| DE | 196 37 245 | 3/1998 |
| DE | 197 57 063 | 6/1999 |
| DE | 198 21 122 | 6/1999 |
| WO | 99 30919 | 6/1999 |
| WO | 00 36435 | 6/2000 |
| WO | 01 98101 | 12/2001 |

* cited by examiner

Primary Examiner—Thomas Mullen
(74) Attorney, Agent, or Firm—Kenyon & Kenyon

(57) ABSTRACT

A method for assisting, in a passing maneuver, for motor vehicles having a distance and speed control device, in which vehicles in the passing lane are taken into account and, if the traffic situation detected by sensors or an intervention by the driver suggests a desire to pass, control is temporarily carried out to an increased passing speed. The distances to the vehicles located in the passing lane are measured and the passing speed is calculated as a function of the distances of the vehicle to be passed and at least the vehicle directly preceding in the passing lane.

17 Claims, 2 Drawing Sheets

METHOD AND DEVICE FOR ASSISTING IN A PASSING MANEUVER FOR MOTOR VEHICLES

FIELD OF THE INVENTION

The present invention relates to a method and device for assisting, in a passing maneuver, motor vehicles having a distance and speed control device, in which vehicles in the passing lane are also taken into account and, if the traffic situation detected by sensors or an intervention by the driver suggests a desire to pass, control is temporarily carried out to an increased passing speed.

BACKGROUND INFORMATION

Distance and speed control devices, or ACC (adaptive cruise control) systems, may be used in motor vehicles. In these systems, objects, such as preceding vehicles, which are in the traffic lane being used by one's own vehicle are detected by a sensor device. Conventionally, the sensor device includes a radar system with which the distance and the relative speed of the preceding vehicle can be measured. With the help of a direction-sensitive radar system or through the aid of additional parameters, e.g., the steering wheel angle of one's own vehicle, the detected objects may be checked for their plausibility so that, for example, vehicles in one's own lane can be distinguished from traffic signs or markings on the edge of the roadway or from vehicles in other lanes. If a preceding vehicle in one's own lane is in the locating range of the radar, the traveling speed may be regulated in such a way by intervention in the drive system and braking system of the vehicle, that a speed-dependent safety distance to the preceding vehicle is maintained. If, however, no vehicle is in the locating range in one's own lane, then control may be carried out to a speed, desired by the driver and input with the aid of a set command, which, in the following, is denoted as "set speed".

German Patent No. 42 00 694, describes an ACC system in which the control is temporarily canceled when the driver intervenes actively in the driving events, for example, by activating the turn signal indicator. Therefore, the control is inactivated in particular when the driver starts to pass. After a certain time span has elapsed, if the passing maneuver is concluded, the control sets in again automatically; in the event of a permanent traffic lane change, a different target object located in the new traffic lane is may be monitored.

In German Patent Application No. 198 21 122, a system is described in which, when the driver (in regions with right-hand traffic) activates the left turn signal lever and thus indicates a desire to pass, the distance control is not inactivated, but rather the setpoint distance to the preceding vehicle is temporarily reduced to a specific minimum value. The result is that in preparation for the passing maneuver, the vehicle is automatically accelerated or less strongly decelerated than would be the case during the normal distance control. This makes it easier for the driver to slip into the traffic flowing in the passing lane, and the passing distance is shortened without the driver having to actively actuate the accelerator. On the other hand, the danger of a collision with the preceding vehicle is avoided, since a certain minimum distance to the preceding vehicle is always honored.

This system may relieve the driver when initiating the passing maneuver so that he/she can concentrate more on the rear traffic; however, the system may not react appropriately in all traffic situations. If, for example, a relatively slow vehicle is driving in the passing lane, following the acceleration phase, a relatively strong deceleration of the vehicle is necessary if the lane change was carried out and the slow vehicle in the passing lane has gotten into the locating range of the radar. The acceleration, uncalled for in this situation, and the subsequent deceleration of the vehicle leads to increased fuel consumption and an adverse influence on comfort and possibly even on traffic safety.

German Patent Application No. 197 57 063, describes an ACC system in which the radar system also measures the relative speeds of vehicles in the passing lane and continually forms an average value from these relative speeds. When a desire by the driver to pass is detectable, acceleration is automatically carried out to an increased traveling speed as a function of this average value. However, inadequate reactions may occur in this system as well, since the speeds of the vehicles in the passing lane are only evaluated statistically.

In German Patent Application No. 196 37 245, an ACC system is described in which the plausibility evaluation of the radar signals is modified when the driver indicates the intention to change lanes by actuating the left or right turn signal lever. In this situation, the traffic lane taken into consideration for the distance control is temporarily expanded to the future new traffic lane, and both the vehicles in the present traffic lane and the vehicles in the future traffic lane are taken into account for the distance control along the lines of a minimum selection. In this way, a consistent distance control is made possible both for a lane change from the right to the left traffic lane, as well as for a change from the left to the right traffic lane; however, no increase in the driving speed takes place to prepare for the passing maneuver.

SUMMARY

An object of the present invention is to provide an ACC system which assists the driver when initiating a passing maneuver, and at the same time is able to react appropriately to a multitude of different traffic situations.

According to the method of the present invention, the distances to the vehicles in the passing lane are measured, and the passing speed is calculated as a function of the distances of the vehicle to be passed and at least the vehicle directly preceding in the passing lane.

Thus, according to the invention, in response to a detectable desire to pass, at least the distances of the two vehicles which have the highest relevance may be detected individually and taken as a basis for the calculation of the passing speed. In this way, the passing speed may be determined as a function of the respective traffic situation, so as, on one hand, to permit the shortest possible passing distance, as well as to make it possible to pull into the traffic flowing in the passing lane without danger; on the other hand, however, both pulling up too close to the vehicle to be passed and too close to a vehicle in the passing lane may be safely avoided. The driver is therefore able to concentrate more on the rear traffic. An unnecessary change between acceleration and deceleration phases and the impairment of comfort and increase in fuel consumption associated with it is avoided to the some extent.

In the design approach of the present invention, the manner in which the distance to the vehicle in the passing lane enters into the calculation of the passing speed is generally not identical to the consideration of the distance during the normal distance and speed control which takes place outside of passing maneuvers and which shall be designated in the following as steady-state control. This yields the advantageous possibility of even entering temporarily into the regular safety distance to the vehicle in the passing lane during a passing maneuver, so that the passing maneuver is shortened and the following traffic is not obstructed any more than necessary.

In one example embodiment, the control to the passing speed taking place prior to and during the passing maneuver is superimposed on the normal steady-state control. This means that the control system for the steady-state control also remains active in the case of a recognized desire to pass and during the passing maneuver. The setpoint speeds or setpoint accelerations which resulted from the two control systems operating in parallel are then, for example, superimposed cumulatively. In another example embodiment, for the steady-state control, during which only vehicles in one's own lane are taken into account, the measured relative speed of the preceding vehicle may be replaced by an imaginary relative speed which is equal to the sum of the measured relative speed and the calculated passing speed.

The superimposition of the two control systems permits smooth transitions between the steady-state control and the passing aid. In addition, a drop below the minimum safety distances may thus be avoided very simply and reliably. Namely, when the distance to the preceding vehicle approaches a critical value, the steady-state control orders a reduction in the setpoint speed which compensates the increase in speed corresponding to the passing speed, so that the distance to the preceding vehicle does not decrease further. In this way, it is also possible, for example, to easily control the situation when the driver initially indicates a desire to pass by setting the direction indicator, but then recognizes that the traffic situation does not permit a lane change and remains in the present lane. Even if the passing aid is only inactivated again with a certain time delay, the superimposition of the two control circuits then ensures that there is no drop below the minimum distance to the preceding vehicle.

If the steady-state control contains a derivative-action component which reacts directly to acceleration or deceleration of the preceding vehicle, then because of the superimposition, this also has an effect on the performance when the passing aid is switched on, even if the passing speed calculated within the framework of the passing aid is not directly dependent on the acceleration or deceleration of the preceding vehicle.

The function of the passing aid is activated instantaneously in response to a recognized desire to pass, however, is preferably designed in such a way that after a certain time span has elapsed, a return to the steady-state control takes place automatically, with smooth transition. This holds true both for the case when the passing maneuver is broken off, and for the case when the passing maneuver is actually carried out. Alternatively or additionally, the return to the steady-state control may also, however, be triggered when it is detected that the lane change was actually carried out. To detect the lane change, it is possible to take advantage of the circumstance that the radar echo from one and the same target object is received from different directions prior to and after the lane change. If available, the signals from a camera system or other lane-detection systems may also be evaluated. This holds true in particular for the case when the vehicle is additionally equipped with an automatic lane-keeping system.

Actuation of the turn signal indicator may be used as a criterion for detecting a desire by the driver to pass. Alternatively or additionally, however, other criteria may also be utilized, for example, an active steering intervention by the driver or, if available, the signals from a lane-detection system. For example, it is possible to ignore the actuation of the left turn signal indicator (in the case of right-hand traffic) when the lane-detection system determines that the vehicle is already in the extreme left lane of the roadway in question.

It is also possible to provide a special switch, for example, in combination with the turn-signal switch, by which the driver may actively indicate or confirm a desire to pass. If the vehicle has a rear-space radar for monitoring the rear traffic in the passing lane, upon approaching a slower vehicle, it is possible to automatically evaluate the traffic situation and to propose a passing maneuver to the driver which the driver then either confirms or rejects.

In another example embodiment, the calculated passing speed may also be a function of the absolute speed of one's own vehicle. This dependence may initially lie in the fact that the passing aid is completely inactivated below a specific threshold speed of, for example, 70 km/h. This is based on the consideration that generally passing maneuvers only take place when traffic is flowing, and that a speed below approximately 70 km/h suggests slow-moving traffic or city traffic, so that actuation of the turn signal indicator in this case more likely indicates a desire to turn off or a simple lane change than a desire to pass. It is also possible to design the transition between complete inactivation and complete activation of the passing aid to be smooth, for instance, in that the passing speed is limited by a ramp function which is dependent on the vehicle's own speed.

The passing speed, which is added as a setpoint value to the setpoint value of the steady-state control, may be defined, for example, as relative speed in relation to the vehicle's own instantaneous speed. An unlimited increase of the resulting setpoint speed is prevented by the time restriction of the passing aid. In addition, the superimposition with the steady-state control provides for a negative feedback.

Given completely activated passing aid and very large distances to the preceding vehicles, the passing speed may be determined, for example, by a constant or speed-dependent specified value. In the case of smaller vehicle distances, a restriction may be imposed accounting for the smaller distances to the preceding vehicles in one's own lane and the passing lane.

Optionally, the passing speed may also include an additive component which is proportional to the relative speed of the preceding vehicle in the passing lane. Given sufficiently large vehicle distances, a better adjustment to the traffic flowing in the passing lane may be achieved.

If several vehicles in the passing lane are within the locating range of the radar, then for each of these vehicles, a passing speed may be calculated which is, for example, a function of the distance and the relative speed of this vehicle. The final passing speed may then be determined by minimum selection. In this way, for example, it is also possible to take into account in advance that while one's own vehicle is starting to pass, another next vehicle, for example, one in the passing lane, suddenly brakes.

DETAILED DESCRIPTION

Figure 1:
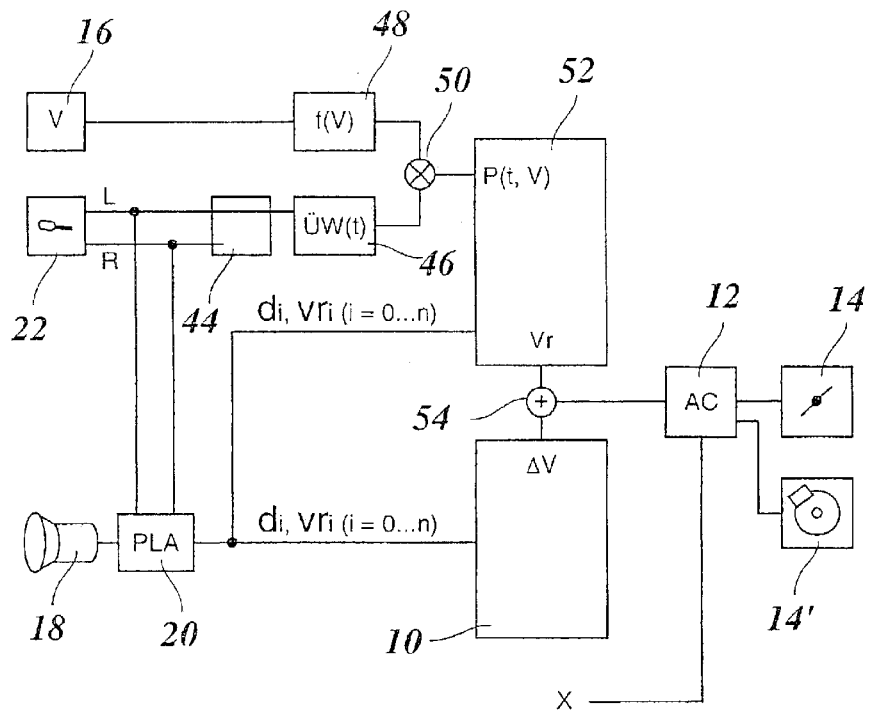
FIG. 1 illustrates a block diagram of an ACC system according to an example embodiment of the present invention.

FIG. 1 shows components of an ACC system, that is, of a distance-control and speed-control system for vehicles, which aid in understanding the present invention. A conventionally constructed steady-state controller 10 acts, via a driver 12, on the drive system and brake system of the vehicle, which are symbolized here by a throttle valve 14 and a brake 14', and regulates the distance of the vehicle to a preceding vehicle.

An angle-resolution radar system 18 is used to detect obstacles in front of one's own vehicle on the roadway or at the edge of the road. Radar system 18 supplies direction and distance information which may be evaluated in a plausibility module 20. Information about the relative speeds of the detected objects may be acquired, for example, either by derivation from the distance information, or directly from the Doppler shift of the radar echo. Based on this information, plausibility module 20 is able to distinguish between preceding vehicles or other obstacles in the lane being used by one's own vehicle and stationary objects at the edge of the roadway or vehicles in adjoining lanes. To this end, when, for example, the roadway is curved, it is also possible to utilize supplementary information, for example, the steering angle of the vehicle.

When plausibility module 20 detects preceding vehicles in one's own lane, then the immediately preceding vehicle is selected as target object, and the distance $d_0$ and relative speed $vr_0$ of this vehicle may be transmitted to steady-state controller 10. If necessary, steady-state controller 10 then brings about a reduction in traveling speed, so that a distance to the preceding vehicle, which is a function of the respective actual speed V, is adhered to. This distance is determined by a setpoint time gap, selected by the driver, which represents the time interval in which the vehicles pass the same point on the roadway. The output signal of steady-state controller 10 is a steady-state setpoint value $\Delta V$ which indicates the decrease or increase of vehicle speed necessary in each case.

In driver 12, this signal is converted into an acceleration command which then brings about a corresponding deceleration or acceleration in the drive system of the vehicle.

If the roadway is clear, the vehicle speed is regulated by a control system, not shown here, to a set speed selected by the driver. Output signal X of this control system, and possibly further controller constituents, for example, for a control with respect to stationary targets, are combined in driver 12 with the signal of the control device described here.

A turn-signal switch 22 supplies output signals L and R which indicate that the driver has actuated the left or right turn signal indicator. Based on these signals, plausibility module 20 recognizes that the driver intends to change the lane presently being used.

Figure 2:
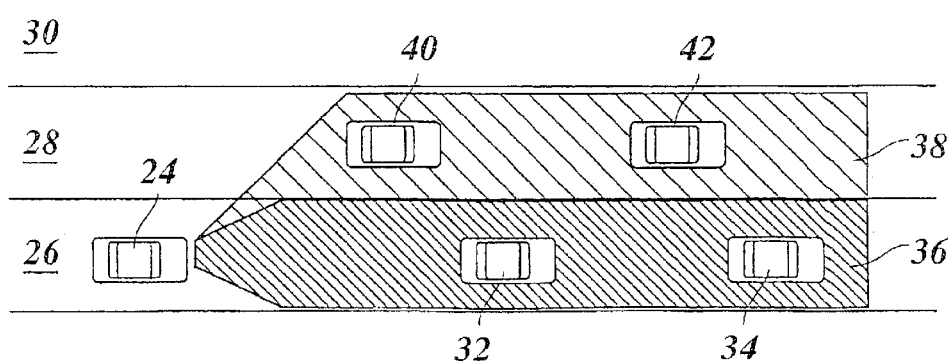
FIG. 2 illustrates the locating range of a vehicle, equipped with the ACC system according to FIG. 1, on a three-lane roadway.

In an example embodiment, FIG. 2 illustrates the case when a vehicle 24, equipped with the ACC system according to FIG. 1, is driving in extreme right lane 26 of a three-lane roadway. The middle and the left passing lane of this roadway are designated by 28 and 30. As long as turn-signal switch 22 is not actuated, plausibility module 20 evaluates only the data of vehicles 32, 34 located in locating range 36 of the radar, darkly hatch marked in FIG. 2, in its own lane 26. Since the radar has only a limited locating depth, the number of detectable vehicles may be limited to a specific maximum value. Vehicle 32 directly preceding is selected as the target object and is used as the basis for the distance control.

If, at this point, signal L of turn-signal switch 22 appears, then in plausibility module 20, the relevant locating range is enlarged by area 38, lightly hatch marked in FIG. 2, so that included in the evaluation is also the data of vehicles 40, 42 which are traveling in passing lane 28, to which the driver would apparently like to change.

If vehicle 24 were located in passing lane 28 and signal R of the turn-signal switch would appear, then the locating range would be extended in corresponding manner to adjacent lane 26 on the right.

If, in countries with right-hand traffic, the left turn signal indicator is actuated in the situation shown in FIG. 2, then this may indicate that the driver would like to pass preceding vehicle 32. However, it may also indicate that the driver, without intention of passing, would simply like to change lanes for other reasons. The example embodiment of the ACC system shown in FIG. 1 is designed to differentiate between these two possibilities on the basis of plausible criteria, and to pursue a different strategy depending on the result of the differentiation. In the case of an intention to pass, a passing aid may be activated which shall be described in detail below. In the case of a lane change without intention of passing, a lane-change strategy may be pursued in steady-state controller 10. According to this strategy, among vehicles 32, 34, 40, 42 located in the enlarged locating range, that vehicle may be selected as the target object which causes the least (positive or negative) setpoint acceleration for one's own vehicle 24, for example, vehicle 40. To prepare for a safe lane change, a distance control is then carried out specific to vehicle 40. If vehicle 40 has a very small distance or is slower than vehicle 32 (for example, in the case of a traffic jam), the speed of vehicle 24 may be reduced at least temporarily. In this context, in steady-state controller 10, an entering strategy may be pursued which permits entering temporarily into the safety margin to vehicle 40 actually provided, and to then fall back again to the regular safety margin. Thus, an excessively sharp deceleration of vehicle 24 may be avoided, which could impair driving comfort or irritate the following traffic.

In the example shown, two criteria are utilized for deciding between the lane-change strategy and the passing aid, for example, the direction of the intended lane change indicated by turn-signal switch 22, and actual speed V of vehicle 24.

In countries with right-hand traffic, as a rule an intention to pass only exists when the left turn signal indicator is actuated. This is true particularly in countries in which, as in Germany, passing on the right is forbidden. Accordingly, in the example shown in FIG. 1, signal L is routed via a switch 44 to a function generator 46 whose output signal $\ddot{U}W(t)$ represents a presumed desire by the driver to pass. In countries with left-hand traffic, signal R would be routed to function generator 46 instead. The function of switch 44 may also be implemented by a suitable software, in conjunction with a parameter which distinguishes between right-hand traffic and left-hand traffic. Since with the aid of radar system 18, the speeds of the vehicles in the various lanes 26, 28 and 30 may be differentiated, and for example, oncoming vehicles in the opposite lane may also be detected, the parameter for right-hand traffic or left-hand traffic may also be derived automatically from the data of the radar system.

In the simplest case, output signal ÜW(t) of function generator 46 assumes only the values 0 and 1, value 1 standing for a desire to pass.

Actual speed V detected by speed sensor 16 may be used as another criterion into the decision. A function generator 48 generates as output signal a function value f(V) that is dependent on speed V and that has the value zero below a specific lower threshold speed $V_{min}$ of, for example, 70 km/h, and above this lower threshold speed, assumes the value 1 at most.

The output signals of function generators 46 and 48 are multiplied by each other at a multiplication point 50, and the product P(t,V) is transmitted to a passing-aid module 52.

Also transmitted to passing-aid module 52 are distances $d_i$ and, optionally, the relative speeds $vr_i$ of all vehicles 32, 34, 40, 42 located in expanded tracking range 36, 38. Index i identifies the individual vehicles. In this context, index i=0 stands for vehicle 32 immediately preceding vehicle 24 in its own lane 26.

Based on this data, passing-aid module 52 calculates a passing speed Vr which is added to steady-state setpoint value ΔV at a summation point 54. In this way, the function of the passing aid is superimposed on the steady-state control.

According to a first exemplary embodiment, passing speed Vr is calculated with the aid of the following equations:

$$Vr = MIN(Vr_i; i=0, \ldots, n) \quad (1)$$

$$Vr_i = MIN(P(t, V) \cdot Vr_{max}, MAX((2 \cdot a \cdot d_i)^{1/2}, Vr_{min})) \quad (2)$$

$$a = MIN(a_0, a(V)) \quad (3)$$

The quantities $Vr_i$ in equation (1) are passing speeds which are calculated according to equation (2) individually for each vehicle 32, 34, 40, 42, independently of the lane and independently of the remaining vehicles. Among these passing speeds, the minimum is selected according to equation (1). This rules out the passing speed from being selected too high with regard to one of the vehicles in the locating range.

In equation (2), $Vr_{max}$ designates a specified value which is valid when distance $d_i$ to the vehicle in question is so great that it can remain out of consideration for ascertaining the passing speed. The radical $(2 \cdot a \cdot d_i)^{1/2}$ corresponds to a relative speed of vehicle 24 in relation to the preceding vehicle in question (e.g., 32), which can be reduced to 0 within relative distance $d_i$ when vehicle 24 is constantly decelerated with acceleration $-a$. This term limits the passing speed and prevents the vehicle from being accelerated too strongly initially and then having to be decelerated again with an undesirably strong deceleration (<−a) in order to avoid a collision with the preceding vehicle. According to equation (3), acceleration, a, taken as a basis here is the minimum from a constant acceleration $a_0$ and a variable acceleration a(V). Constant acceleration $a_0$, may be selected such that it is not felt as uncomfortable or disturbing by the driver or the passengers of vehicle 24. Variable acceleration, a(V), represents the actual acceleration capability of the vehicle which may be a function of the traveling speed and, optionally, other parameters, as well, for example, the payload.

Quantity $Vr_{min}$ in equation (2) represents a minimum passing speed which is intended to be valid when, in the case of a very small vehicle distance, the radical is nearly 0. This minimum passing speed may also be set equal to 0. However, even at a positive value, it does not lead to a danger of collision, since its effect is compensated by a corresponding decrease of steady-state setpoint value ΔV if there is too close an approach to the preceding vehicle. In each case, the upper limit for passing speed $Vr_i$ is given by $P(t, V) \cdot Vr_{max}$, and this quantity is equal to 0 when product P(t,V) is equal to 0.

The function of the passing aid shall now be illustrated in terms of a few practical examples.

First of all, it shall be assumed that vehicle 24 is driving up to vehicle 32 with higher speed, and the passing aid is activated (P(t,V)=1). Steady-state controller 10 would then normally bring about a deceleration of the vehicle corresponding to the decreasing distance to vehicle 32. However, passing-aid module 52 counteracts this, in that the setpoint speed is increased by Vr. Vehicle 24 will therefore not become slower or become only a little slower, making it easier to slip into lane 28.

Since, however, according to equation (2), Vr is limited as a function of the distance to vehicle 40, vehicle 24 can be prevented from pulling up so close to vehicle 40 that a change to lane 28 would no longer be possible without danger. As a rule, however, passing vehicle 40 will have a relatively high speed, so that the appertaining distance $d_i$ increases rapidly and the corresponding reduction in speed of vehicle 24 turns out to be relatively small.

If vehicle 40 were not present, and the distance to vehicle 32 were still relatively great, an acceleration of vehicle 24 could even result, so that the passing maneuver would be shortened.

As a further function example, the case shall be considered that vehicle 24 has already been following vehicle 32 for some time with a constant distance, and the driver only then actuates the left turn signal indicator. In this case, steady-state setpoint value, ΔV, is approximately 0, while passing speed, Vr, is in each case positive. Consequently, vehicle 24 is automatically accelerated. Because vehicle 40 moves away quickly, and thus does not effectively limit the acceleration, the setpoint value, which is ultimately supplied to driver 12, corresponds to an increase in speed by $Vr_{max}$. For example, this speed increase may amount to approximately 20 km/h.

Figure 3:
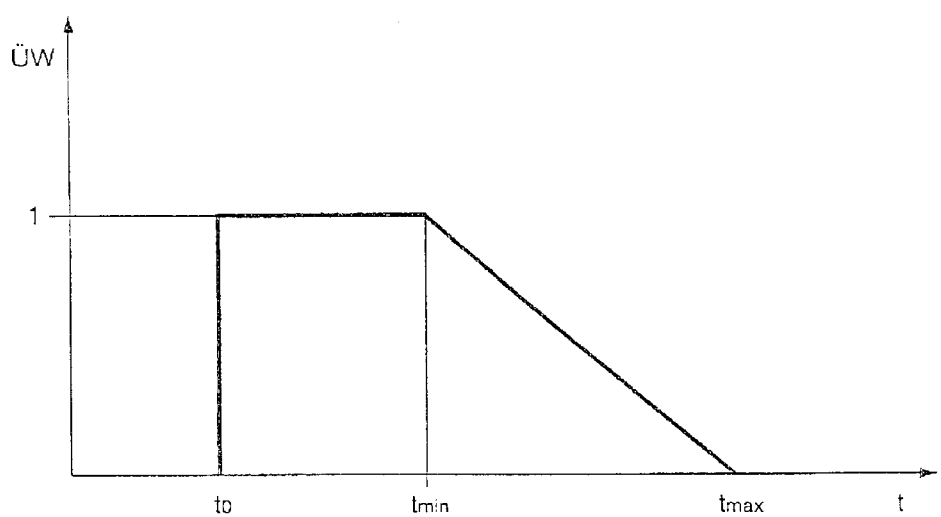
FIG. 3 illustrates a function graph indicating the time dependence of a passing aid implemented in the ACC system.

As FIG. 3 shows, ÜW(t) is a time-dependent function which may also assume intermediate values between 0 and 1. If, at moment $t_0$, the left turn indicator is set, the function rises suddenly to 1 and then remains constant at value 1 for a certain time, for example, for three seconds. After this time span has expired, at $t_{min}$ the function value then decreases steadily until at time $t_{max}$, e.g. after a further three seconds, it again reaches value 0.

Since ÜW(t) enters as a factor into product P(t,V), and thus also into equation (2), passing speed Vr output at summation point 54 in each case declines again between $t_{min}$ and $t_{max}$ to 0, with the result that the steady-state control gradually gains sole control again. This time response is independent of whether vehicle 24 actually changes to passing lane 28, or whether it remains in lane 26. In both cases, a gradual transition takes place to the distance control, either specific to vehicle 32 or to vehicle 40. Correspondingly, in plausibility module 20, after a certain time span the locating range is also gradually or suddenly narrowed down again to the lane actually being used by the vehicle.

Figure 4:
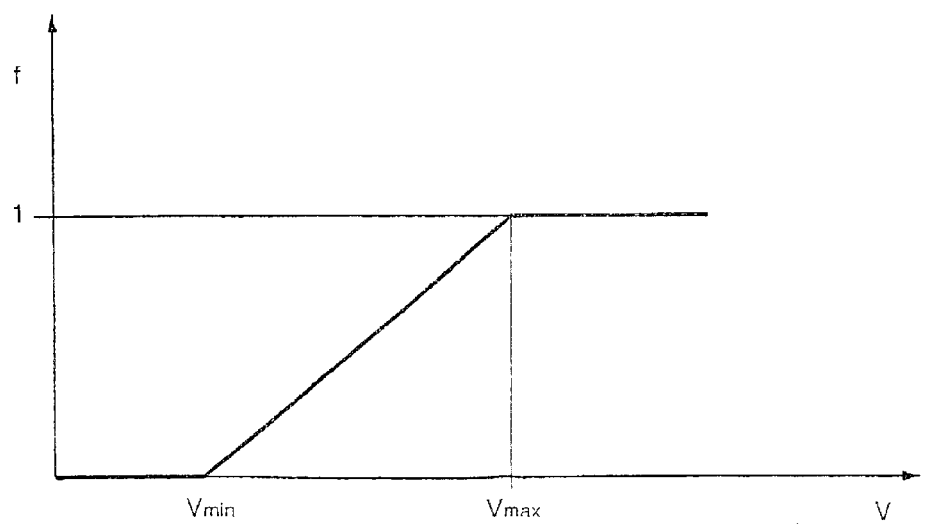
FIG. 4 illustrates a function graph indicating the speed dependence of the passing aid.

As FIG. 4 shows, speed-dependent function f(V) may also assume intermediate values between 0 and 1. Up to speed $V_{min}$ (e.g., 70 km/h), the function has the value 0. In the speed range between $V_{min}$ and $V_{max}$ (e.g., 100 km/h), the function value increases in a linear fashion to 1 and then remains constant at 1, so that the passing aid first deploys its full effectiveness at speeds above approximately 100 km/h. It may be that the passing aid is active in the intermediate range between $V_{min}$ and $V_{max}$, however, passing speed Vr is then correspondingly less. Therefore, quick acceleration maneuvers may be avoided when traffic is flowing more slowly.

Independently of the speed dependence of function f(V), values $Vr_{max}$ and $Vr_{min}$ in equation (2) may also be speed-dependent.

In another exemplary embodiment, passing speed Vr is calculated in passing-aid module 52 according to the following equations:

$$Vr = \text{MIN}(Vr', (a^*d_0)^{1/2}) \quad (4)$$

$$Vr' = \text{MIN}(vr_i; i=1, \ldots, n) \quad (5)$$

$$vr_i = \text{MAX}(0, vr_0 + (a^*d_0)^{1/2}) \quad (6)$$

In equations 4 and 6, acceleration, a, has the same meaning as in equations (2) and (3). The absence of factor 2 in the radical in equation (6) (compare equation (2)) means that only half the distance to the preceding vehicle is used here as the relevant distance, so that a greater safety margin is achieved.

In this specific embodiment, passing speed Vr' is initially calculated without consideration of vehicle 32 directly preceding in the same lane. Alternatively, all the vehicles in one's own lane, for example, vehicle 34 may also remain out of consideration. The distance to immediately preceding vehicle 32 is only considered here in equation (4) in the form of a distance-dependent limiting of passing speed Vr'.

Furthermore, equation (5) differs from equation (2) in that relative speed $vr_i$, of the preceding vehicle, for example, of vehicle 40 or 42, is added to the distance-dependent root term. Since these relative speeds may also be negative, a limiting downward to passing speed 0 may be carried out.

Since in this example embodiment, the passing speed is also dependent on the relative speed of vehicles 40, 42 in the passing lane, the slower that the slowest of vehicles 40, 42 in the passing lane is, the less the ultimately valid passing speed Vr becomes. For example, if vehicle 42 suddenly brakes, this may already lead to a limitation of the passing speed, as well. This is also expedient, because it is then foreseeable that the driver of vehicle 40 will also brake, so that vehicle 24 must be decelerated as well, if the driver begins to pass.

According to another example embodiment of the present invention, it is also possible to take the relative accelerations of participant vehicles 32, 34, 40, 42 into account as well.

While in the example embodiments shown, the passing speed continues to be limited along the lines of a minimum selection in order to take the distances of the different vehicles into account, in other specific embodiments, it is also possible to form the passing speed per vehicle or for all vehicles together in the form of a weighted sum, which is composed of speed-dependent and/or distance-dependent components.

What is claimed is:

1. A method for assisting in a passing maneuver of a motor vehicle, the motor vehicle including a distance and speed control device, comprising:
   measuring a distance to a vehicle located in a passing lane;
   calculating a passing speed as a function of a distance of a vehicle to be passed and the distance of the vehicle located in the passing lane, the vehicle located in the passing lane preceding the motor vehicle;
   temporarily increasing by the passing speed if one of a traffic situation detected by sensors or an intervention by a driver, indicates a desire to pass;
   in an event of the indication of the desire to pass, carrying out a passing-aid function parallel to a steady-state control, and superimposing an output signal corresponding to the passing speed with a manipulated variable supplied by the steady-state control.

2. The method according to claim 1, further comprising:
   calculating a respective vehicle-specific passing speed for each preceding vehicle detected; and
   determining a final passing speed by minimum selection from the vehicle-specific passing speeds.

3. The method according to claim 1, further comprising:
   wherein the passing speed is a function taking into account relative speeds of vehicles located in the passing lane.

4. The method according to claim 1, wherein the intervention by the driver includes at least one of actuation of a turn signal and an active steering intervention.

5. The method according to claim 1, wherein the intervention by the driver includes a special switch.

6. The method according to claim 1, wherein the sensors include a rear-space radar.

7. The method of claim 1, wherein the passing-aid function is inactivated below a threshold speed of the motor vehicle.

8. A method for assisting in a passing maneuver of a motor vehicle, the motor vehicle including a distance and speed control device, comprising:
   measuring a distance to a vehicle located in a passing lane;
   calculating a passing speed as a function of a distance of a vehicle to be passed and the distance of the vehicle located in the passing lane, the vehicle located in the passing lane preceding the motor vehicle;
   temporarily increasing by the passing speed if one of a traffic situation detected by sensors or an intervention by a driver, indicates a desire to pass;
   in an absence of the indication of the desire to pass, carrying out a steady-state control, specific to a pre-selected distance between the motor vehicle and a preceding vehicle, wherein the pre-selected distance is selected by the driver; and
   in an event of the indication of the desire to pass, carrying out a passing-aid function parallel to the steady-state control, and superimposing an output signal corresponding to the passing speed with a manipulated variable supplied by the steady-state control.

9. The method according to claim 8,
   wherein the manipulated variable of the steady-state control is a steady-state setpoint value for an increase or decrease of a traveling speed; and
   wherein the passing speed is added to the steady-state setpoint value.

10. The method according to claim 8, wherein the passing-aid function is carried out for a limited time span after the event of the indication of the desire to pass.

11. The method according to claim 10, wherein an output signal representation of the passing aid function is limited according to a time-dependent function whose function value decreases continually to zero after a predetermined time span.

12. The method according to claim 8, wherein the passing-aid function is only active at vehicle speeds above a predefined threshold speed.

13. The method according to claim 12, wherein an output signal representative of the passing speed is limited according to a speed-dependent function having the value zero below the predefined threshold speed, and increasing continually from the predefined threshold speed.

14. A method for assisting in a passing maneuver of a motor vehicle, the motor vehicle including a distance and speed control device, comprising:
- measuring a distance to a vehicle located in a passing lane;
- calculating a passing speed as a function of a distance of a vehicle to be passed and the distance of the vehicle located in the passing lane, the vehicle located in the passing lane preceding the motor vehicle;
- temporarily increasing by the passing speed if one of a traffic situation detected by sensors or an intervention by a driver, indicates a desire to pass;
- calculating a respective vehicle-specific passing speed for each preceding vehicle detected; and
- determining a final passing speed by minimum selection from the vehicle-specific passing speeds,
- wherein an upper limit of each respective vehicle-specific passing speed is a variable dependent on a distance of the corresponding preceding vehicle.

15. The method according to claim 14, wherein the variable is proportional to a square root of the distance of the corresponding preceding vehicle.

16. A method comprising:
- measuring a distance to a vehicle located in a passing lane;
- calculating a passing speed as a function of a distance of a vehicle to be passed and the distance of the vehicle located in the passing lane, the vehicle located in the passing lane preceding the motor vehicle;
- temporarily increasing by the passing speed if one of a traffic situation detected by sensors or an intervention by a driver, indicates a desire to pass, wherein the passing speed is a function taking into account relative speeds of vehicles located in the passing lane;
- for each respective one of the vehicles located in the passing lane, calculating a respective vehicle-specific passing speed as a function of the relative speed and a respective distance of the respective one of the vehicles; and
- determining a final passing speed by minimum selection from the vehicle-specific passing speeds;
- wherein an upper limit of the final passing speed is a variable which is a function of a distance of an immediately preceding vehicle in a traveling lane of the motor vehicle.

17. A system for assisting in a passing maneuver for a motor vehicle, comprising:
- a distance sensor configured to detect distances of preceding vehicles including distances to vehicles in a passing lane;
- a steady-state controller configured to supply a command in a form of a steady-state setpoint value to an arrangement for increasing or lowering the vehicle speed, and further configured to perform a steady-state control to one of regulate the vehicle speed to a set speed selected by a driver of the motor vehicle or regulate a distance of the motor vehicle to a preceding vehicle in a same lane as the motor vehicle;
- a device configured to detect an event indicating a desire of the driver to pass;
- a passing-aid module configured to carry out a passing-aid function parallel to the steady-state control to increase the steady-state setpoint value by a passing speed as a function of the distance of the motor vehicle to the immediately preceding vehicle in the same lane and a distance of at least an immediately preceding vehicle in the passing lane, when the event indicating the desire to pass is detected.

* * * * *

UNITED STATES PATENT AND TRADEMARK OFFICE
CERTIFICATE OF CORRECTION

PATENT NO. : 6,842,687 B2  Page 1 of 1
APPLICATION NO. : 10/296834
DATED : January 11, 2005
INVENTOR(S) : Hermann Winner et al.

It is certified that error appears in the above-identified patent and that said Letters Patent is hereby corrected as shown below:

On the face of the patent, # (57) Abstract, line 1, change "a passing maneuver, for motor" to --a passing maneuver, motor--

Column 7, line 47, change "which can be reduced" to --which may be reduced--

Column 9, line 24, change "In this specific embodiment," to --In this example embodiment--

Column 10, line 3, change "indicates a desire to pass;" to --indicates a desire to pass; and--

Signed and Sealed this

Seventh Day of November, 2006

JON W. DUDAS
*Director of the United States Patent and Trademark Office*